(12) United States Patent
Kumar et al.

(10) Patent No.: US 10,552,942 B2
(45) Date of Patent: Feb. 4, 2020

(54) REDUCING COLOR ARTIFACTS IN PLENOPTIC IMAGING SYSTEMS

(71) Applicants: Aashish Kumar, Bangalore (IN); Manuel Martinello, Mountain View, CA (US)

(72) Inventors: Aashish Kumar, Bangalore (IN); Manuel Martinello, Mountain View, CA (US)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/699,733

(22) Filed: Sep. 8, 2017

(65) Prior Publication Data

US 2019/0080434 A1  Mar. 14, 2019

(51) Int. Cl.
*G06T 3/40* (2006.01)
*H04N 9/04* (2006.01)
*G06T 5/00* (2006.01)

(52) U.S. Cl.
CPC ............. *G06T 3/4015* (2013.01); *H04N 9/04* (2013.01); *G06T 5/001* (2013.01); *G06T 2207/10024* (2013.01)

(58) Field of Classification Search
CPC ......... G06T 3/4015; G06T 2207/10024; G06T 5/001; H04N 9/04
USPC ....................................................... 348/335
See application file for complete search history.

(56) References Cited

U.S. PATENT DOCUMENTS

| 9,544,583 | B2 | 1/2017 | Meng et al. | |
|---|---|---|---|---|
| 2010/0265385 | A1* | 10/2010 | Knight | H04N 5/232 348/340 |
| 2011/0149125 | A1* | 6/2011 | Morimoto | H04N 5/225 348/272 |
| 2016/0205394 | A1* | 7/2016 | Meng | G06T 7/80 348/187 |
| 2016/0260205 | A1 | 9/2016 | Namboodiri et al. | |
| 2016/0313889 | A1* | 10/2016 | Venis | G06Q 30/0241 |

OTHER PUBLICATIONS

Chai, J-X. et al., "Plenoptic Sampling," SIGGRAPH 2000, Proceedings of the 27th Annual Conference on Computer Graphics and Interactive Techniques, ACM, 2000, pp. 307-318.

(Continued)

*Primary Examiner* — Lin Ye
*Assistant Examiner* — Chan T Nguyen
(74) *Attorney, Agent, or Firm* — Fenwick & West LLP

(57) ABSTRACT

In one aspect, a color plenoptic imaging system captures a plenoptic image of an object. The plenoptic image is made up of a plurality of superpixels, and each superpixel includes a center subpixel. The collection of center subpixels from the plurality of superpixels forms a set of captured center view data for the object. The sensor array includes at least two arrays of different color sensors that capture subpixels of different colors. The microlens array and the sensor array are positioned such that, within the set of captured center view data, for each of the different colors, adjacent center subpixels of that color are separated by not more than three intervening center subpixels of a different color.

14 Claims, 8 Drawing Sheets

(56) References Cited

OTHER PUBLICATIONS

Yu, Z. et al., "An Analysis of Color Demosaicing in Plenoptic Cameras," 2012 IEEE Conference on Computer Vision and Pattern Recognition (CVPR), IEEE, Jun. 16-21, 2012, pp. 901-908.
U.S. Appl. No. 15/453,891, filed Mar. 8, 2014, Inventors: Aashish Kumar et al. [Copy Not Enclosed].
U.S. Appl. No. 15/689,974, filed Aug. 29, 2017, Inventor: Manuel Martinello [Copy Not Enclosed].

* cited by examiner

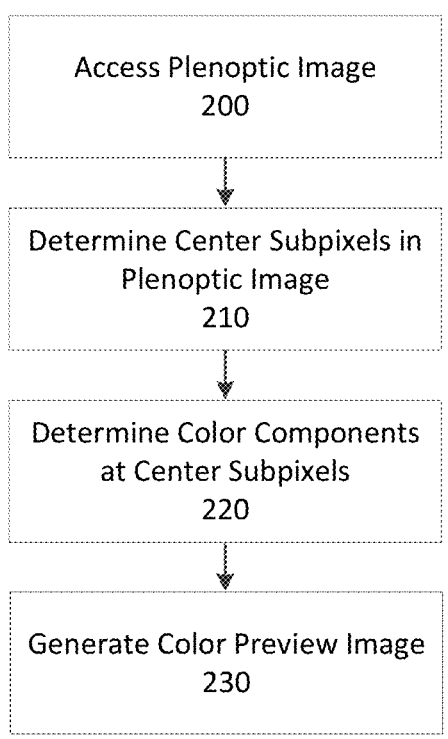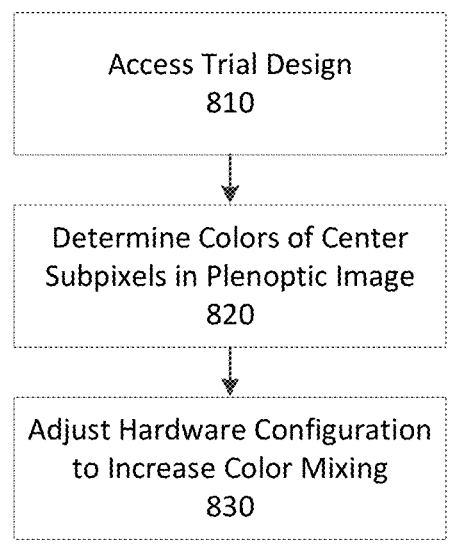
FIG. 2
FIG. 8

REDUCING COLOR ARTIFACTS IN PLENOPTIC IMAGING SYSTEMS

BACKGROUND

1. Technical Field

This disclosure relates generally to reducing color artifacts in plenoptic imaging systems.

2. Description of the Related Art

Plenoptic imaging systems that generate color images have recently received increased attention. Generally, plenoptic imaging systems can be used to recalculate a different focus point or point of view of an object, based on digital processing of the captured plenoptic image. However, plenoptic imaging systems use sensor arrays in a different manner than conventional cameras and plenoptic imaging systems that use conventional color sensors can exhibit color artifacts.

In one approach, complex algorithms may attempt to digitally remove unwanted color artifacts. However, this can add complexity and cost. It can also slow the generation of color preview and other real-time images.

In another approach, plenoptic imaging systems may be calibrated to generate corrections for color artifacts. However, this requires the use of a separate calibration process. At best, this is an extra process that must be performed. At worst, it may be performed incorrectly or without good results.

SUMMARY

In one aspect, a color plenoptic imaging system includes imaging optics, a microlens array and a sensor array. The imaging optics images an object onto an image plane of the imaging optics. It is characterized by a pupil located at a pupil plane. The microlens array is located at the image plane of the imaging optics. The sensor array is located at a conjugate to the pupil plane. The microlens array images the pupil plane onto the sensor array, and the sensor array captures a plenoptic image of the object. The plenoptic image is made up of a plurality of superpixels, and each superpixel includes a center subpixel. The collection of center subpixels from the plurality of superpixels form a set of captured center view data for the object. The sensor array includes at least two arrays of different color sensors that capture subpixels of different colors. The microlens array and the sensor array are positioned such that, within the set of captured center view data, for each of the different colors, adjacent center subpixels of that color are separated by not more than three intervening center subpixels of a different color.

Another aspect is a method for designing such a plenoptic imaging system. For a trial design of the plenoptic imaging system, the colors of the center subpixels is determined. The trial design is improved based on reducing the number of adjacent center subpixels that are the same color.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the accompanying drawings, in which:

FIG. 2 is a flow diagram of one method for generating a color preview image from captured plenoptic images, according to one example embodiment.

FIG. 8 is a flow diagram of one method for designing a plenoptic imaging system, according to one example embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
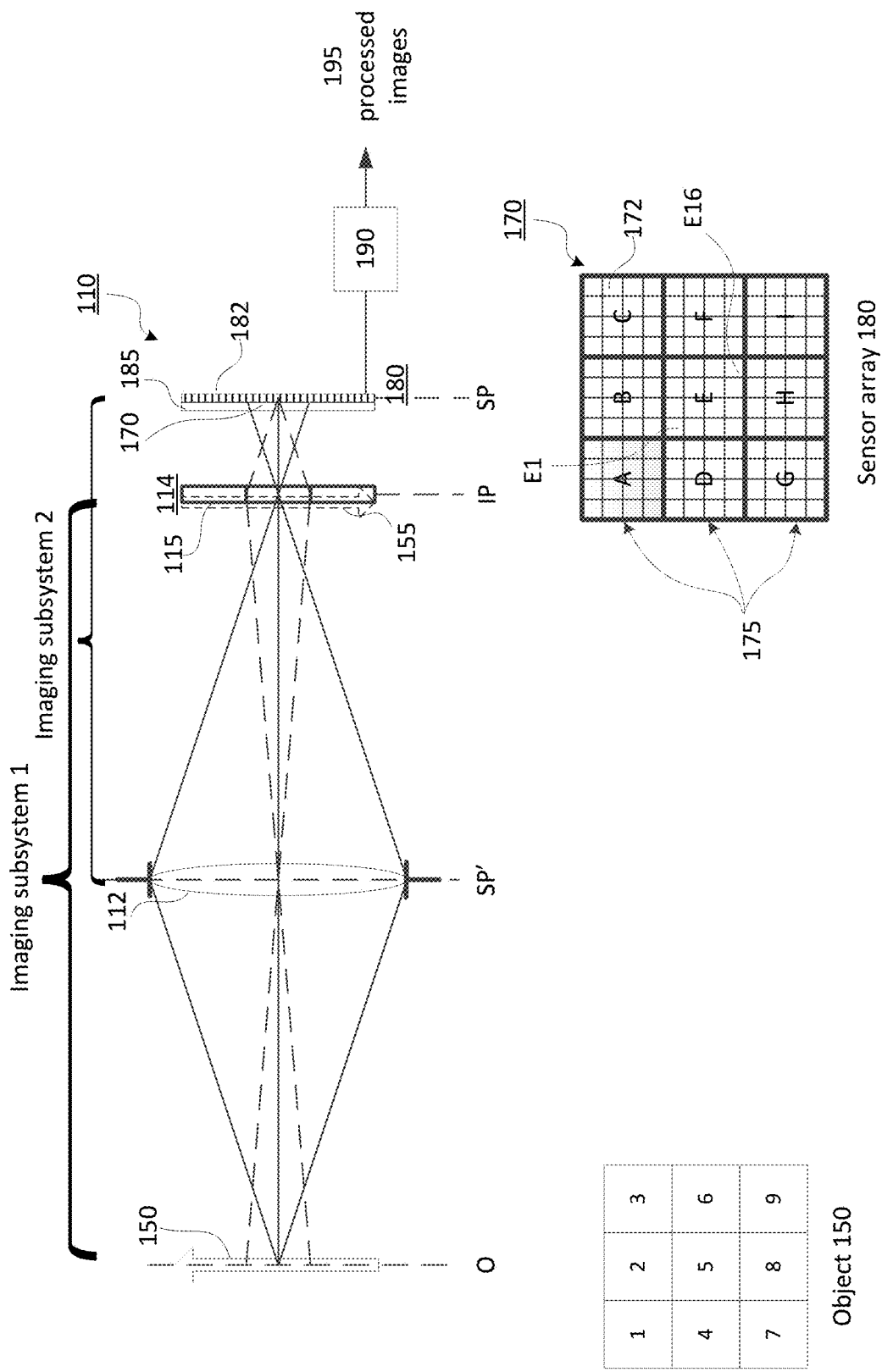
FIG. 1 is a diagram of a plenoptic imaging system, according to one example embodiment.

FIG. 1 is a diagram illustrating a plenoptic imaging system. The plenoptic imaging system 110 includes imaging optics 112 (represented by a single lens in FIG. 1), a microlens array 114 (an array of microlenses 115) and a sensor array 180. The microlens array 114 and sensor array 180 together may be referred to as a plenoptic sensor module. These components form two overlapping imaging subsystems, shown as subsystem 1 and subsystem 2 in FIG. 1.

For convenience, the imaging optics 112 is depicted in FIG. 1 as a single objective lens, but it should be understood that it could contain multiple elements. The objective lens 112 forms an optical image 155 of the object 150 at an image plane IP. The microlens array 114 is located at the image plane IP, and each microlens images the aperture of imaging subsystem 1 onto the sensor array 180. The aperture may be considered the pupil of imaging subsystem 1. That is, the sensor array and aperture are located at conjugate planes SP (i.e. the sensor plane) and SP' (i.e. the pupil plane). The microlens array 114 can be a rectangular array, hexagonal array or other types of arrays. The sensor array 180 is also shown in FIG. 1.

The sensor array 180 includes different color sensors 182, for example arrays of red, green and blue color sensors arranged in a Bayer pattern. In some embodiments, this is achieved by use of a color filter array 185. In one example embodiment, the color filter array 185 includes red, green and blue microfilters, one per sensor, arranged in a Bayer pattern. The Bayer pattern has twice as many green elements as either red or blue. As a result, the sensor array 180 captures red, green and blue color channels.

The bottom portion of FIG. 1 provides more detail. In this example, the microlens array 114 is a 3×3 array of microlenses 115. The object 150 is divided into a corresponding 3×3 array of regions, which are labeled 1-9. Each of the regions 1-9 is imaged by the imaging optics 112 and imaging subsystem 1 onto one of the microlenses 114. The dashed rays in FIG. 1 show imaging of region 5 onto the corresponding center microlens.

Each microlens 115 images these rays onto a corresponding section of the sensor array 180. The sensor array 180 is shown as a 12×12 rectangular array. FIG. 1 also shows the plenoptic image 170 captured by the sensor array 180, which can be subdivided into superpixels 175, labelled A-I, with each superpixel corresponding to one of the microlenses and therefore also corresponding to a certain region of the object 150. In FIG. 1, superpixel E corresponds to the center microlens, which corresponds to region 5 of the object. That is, the sensors within superpixel E capture light from region 5 of the object.

Each superpixel contains many individual subpixels 172. Generally each subpixel corresponds to a sensor of the sensor array. In this example, the plenoptic image has a 3×3 array of superpixels, and each superpixel 175 has a 4×4 array of individual subpixels 172. Each subpixel within a superpixel captures light from the same region of the object, but at different propagation angles. For example, the upper left subpixel E1 in superpixel E captures light from region 5, as does the lower right subpixel E16 in superpixel E. However, the two subpixels capture light propagating in different directions from the object. This can be seen from the solid rays in FIG. 1. All three solid rays originate from the same object point but are captured by different subpixels within the same superpixel. That is because each solid ray propagates along a different direction from the object.

In other words, the object 150 generates a four-dimensional light field $L(x,y,u,v)$, where $L$ is the amplitude, intensity or other measure of a ray originating from spatial location $(x,y)$ propagating in direction $(u,v)$. Each subpixel 172 captures light from a certain volume of the four-dimensional light field. The subpixels are sampling the four-dimensional light field. The shape or boundary of such volume is determined by the characteristics of the plenoptic imaging system.

In certain plenoptic imaging system designs, the sample volumes are hyperrectangles. That is, every subpixel within a superpixel captures light from the same rectangular $(x,y)$ region associated with the superpixel 175, and each subpixel 172 within the superpixel captures light from a different rectangular $(u,v)$ region. However, this is not always the case. For convenience, the superpixels will be described as capturing light from a certain region of the object 150 (even though subpixels within that superpixel may capture light from slightly different regions), and the subpixels will be described as capturing light from a certain range of propagation directions (even though the range may be different for different subpixels, or even for different $(x, y)$ points captured by the same subpixel). Regardless of the details, the plenoptic imaging system creates a plenoptic image 170, which maps $(x,y)$ spatial locations and $(u,v)$ propagation directions to subpixels. This is in contrast to a conventional image, which maps $(x,y)$ spatial locations to pixels but loses information about the $(u,v)$ propagation directions.

The superpixel is the aggregate of all subpixels that have the same light field viewing region. The view is an analogous concept for propagation direction. The view is the aggregate of all subpixels that have the same light field viewing direction. In the example of FIG. 1, the individual subpixels A1, B1, C1, ... I1 make up the upper left view of the object. The individual subpixels A16, B16, C16, ... I16 make up the lower right view of the object. The center view is the view that corresponds to $(u,v)=(0,0)$, assuming that the plenoptic imaging system is an on-axis symmetric system. The centroid of each superpixel is the point in the superpixel that corresponds to $(u,v)=(0,0)$, and the center subpixel is the subpixel that contains that point.

Because the plenoptic image 170 contains information about the four-dimensional light field produced by the object, the processing module 190 can be used to perform different types of analysis, such as depth estimation, three-dimensional reconstruction, synthetic refocusing, extending the depth of focus, spectral analysis and other types of multi-view analysis. The analysis results in processed images 195.

Figure 3:
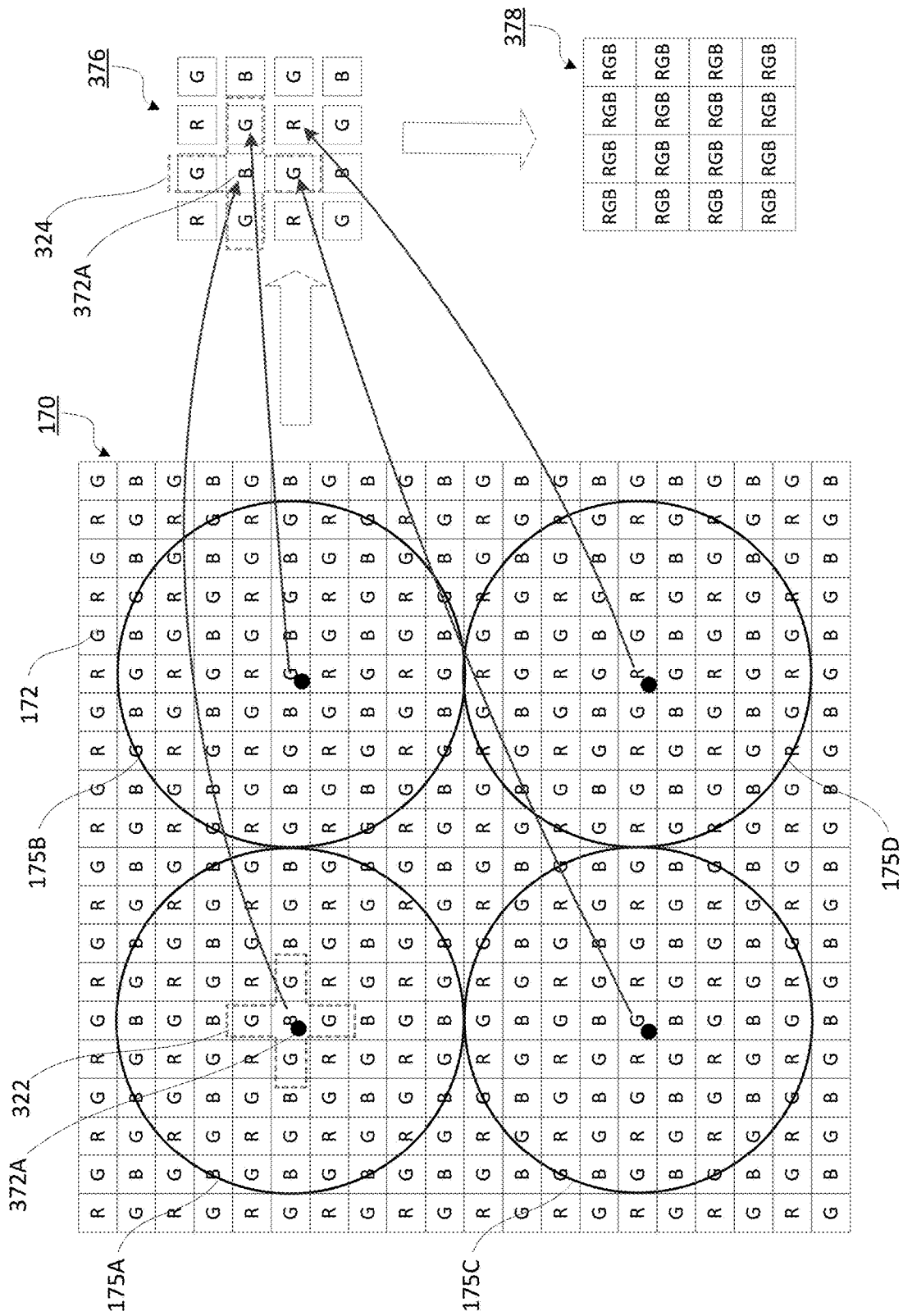
FIG. 3 is a diagram illustrating the method of FIG. 2, including spacing of center subpixels in a square-packed plenoptic image according to one example embodiment.

In many cases, it is useful to generate a preview image of what the plenoptic image is capturing. FIGS. 2 and 3 are diagrams illustrating one method for generating a color preview image from captured plenoptic images, according to one example embodiment. In the flow diagram of FIG. 2, the system begins by accessing 200 a plenoptic image captured by the plenoptic imaging system. The lefthand side of FIG. 3 shows a portion of a plenoptic image 170 that contains a 2×2 array of superpixels 175A-D. The full plenoptic image will be much larger and contain many more superpixels. In FIG. 3, these superpixels 175 are largely round, as opposed to the square superpixels shown in FIG. 1, because the pupil for the primary optics 112 is round. Additionally, these superpixels 175 are square packed because the microlens array 114 is a square array. In other embodiments, the superpixels can have different shapes and the array of superpixels can take any other packing structure (e.g. rectangular or hexagonal). Each small square is a subpixel 172 of the plenoptic image. In this example, a Bayer filter is used so the subpixels 172 are red, green or blue color subpixels, as denoted by the R, G or B in each square.

Returning to FIG. 2, the system determines 210 the centroids and center subpixels 372 of the superpixels 175. This can be done using a signal power analysis, a geometric analysis, or spectral analysis of each superpixel or of the array of superpixels. In FIG. 3, the centroid of each superpixel 175A-D is marked by a "•", and the center subpixel 372A-D is the subpixel with the "•". For clarity, only center subpixel 372A is labelled in FIG. 3. The center subpixel 372 of each superpixel 175 is the subpixel that corresponds to the center view of the plenoptic image.

The upper right of FIG. 3 shows a collection of just the center subpixels 372. For convenience, this collection of center subpixels will be referred to as the captured center view data 376. Only a 4×4 set of center subpixels is shown. The full collection will have the same number of center subpixels as there are superpixels. The center 2×2 set of center subpixels in this captured data 376 are the center subpixels 372A-D from the plenoptic image 170. The arrows between the plenoptic image 170 and the captured data 376 show the correspondence. Center subpixel 372A from the plenoptic image 170 corresponds to center subpixel 372A in the captured center view data 376, and so on.

This center view data 376 is used to generate a color preview image 378, which has red, green and blue components for every subpixel (again, not all subpixels are shown in FIG. 3). Returning to FIG. 2, the system determines 220 the different color components at the center subpixel locations. These color components are then used to generate 230 the low resolution color preview image 378.

As shown in FIG. 3, each center subpixel 372 in the captured data 376 is a specific color. The other color components typically are interpolated from other data. For example, in FIG. 3, center subpixel 372A is a blue subpixel. The red and green components for that location are interpolated from neighboring red and green values. In one approach, bilinear interpolation based on the four nearest neighbors is used. Using green as an example, it could be the four nearest neighbors in the plenoptic image 170, as shown by the dashed cross 322 in the plenoptic image 170. Alternately, it could be the four nearest neighbors in the raw data 376, as shown by the dashed cross 324 in that figure. Generally, interpolation about the cross 324 provides a higher quality center view.

Assume that the four closest green subpixels are located at $(i_1, j_1)$, $(i_1, j_2)$, $(i_2, j_1)$, and $(i_2, j_2)$; and their pixel values are given by $G_{11}$, $G_{12}$, $G_{21}$, and $G_{22}$, respectively. The system can determine the pixel value at the center subpixel location, $G_{center\ view}$, by interpolating in the i-direction and then the j-direction as follows:

$$G_{P1} = \frac{i_2 - i}{i_2 - i_1} G_{11} + \frac{i - i_1}{i_2 - i_1} G_{21} \quad (1)$$

$$G_{P2} = \frac{i_2 - i}{i_2 - i_1} G_{12} + \frac{i - i_1}{i_2 - i_1} G_{22} \quad (2)$$

$$G_{center\ view} = \frac{j_2 - j}{j_2 - j_1} G_{P1} + \frac{j - j_1}{j_2 - j_1} G_{P2} \quad (3)$$

If nearest neighbors in the plenoptic image are used, then $G_{center\ view}$ can be described as the approximate green pixel value of the center view based on the green pixel values of nearby views within the superpixel. In another embodiment, the processing module interpolates about the j-direction before the i-direction.

The accuracy of the interpolation depends in part on how close the nearest neighbors are. For superpixel 175A in FIG. 3, the blue component will be accurate because it is directly sampled. That is, the center subpixel 372A is a blue subpixel. The green component will likely be fairly accurate because the four nearest neighbors are directly adjacent subpixels. The red component will be the least accurate because the four nearest neighbors are farther away.

Some inaccuracy can be tolerated. However, if the inaccuracies are persistent over a large area (e.g., if a large number of adjacent superpixels all have blue center subpixels so that the red is inaccurate for that entire area), that can lead to unwanted color artifacts. If the inaccuracies have structure (e.g., if there are bands of superpixels that all have blue center subpixels), that can also cause unwanted color artifacts.

Note that in FIG. 3, the center subpixels 372 alternate between red, green and blue as a result of the superpixel spacing compared to the subpixel size. The distance between adjacent center subpixels is 9 subpixels, which is an odd number of subpixels. For convenience, this distance will be referred to as the center subpixel spacing, and the distance between adjacent centroids will be referred to as the centroid spacing. Therefore, if one center subpixel is green, then the adjacent center subpixel will not be green. If the superpixel spacing was slightly larger (e.g., if the center subpixel spacing was 10 subpixels instead of 9 subpixels), then the center subpixels 372 would all be the same color instead of alternating in color, which could lead to color artifacts.

Figure 4A:
FIGS. 4A and 4B illustrate color components with weaker and stronger color image artifacts, according to one example embodiment.
Figure 4B:
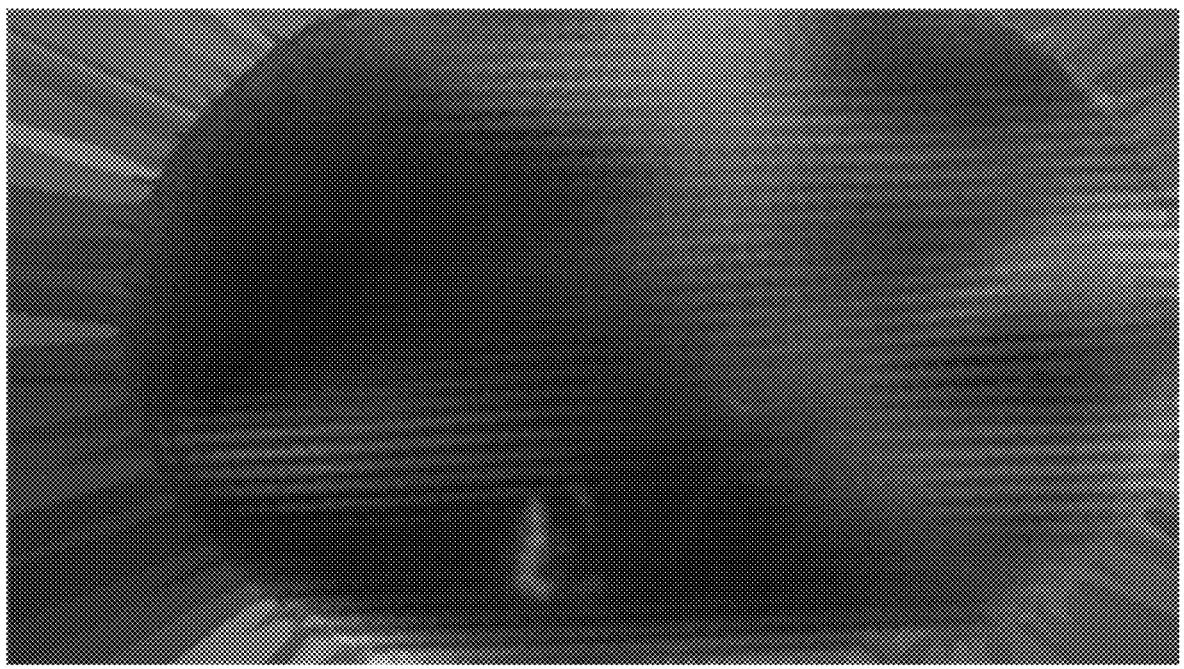

FIGS. 4A and 4B illustrate this. FIGS. 4A and 4B illustrate the blue color component of a preview image. This is generated from a plenoptic image with a hexagonally packed array of center subpixels, using an underlying RGB Bayer sensor array. The color components are determined by bilinear interpolation of the subpixels of the plenoptic image. These figures are preview images of the interior of the ear canal.

In FIG. 4A, the microlens array and sensor array are sized so that adjacent center subpixels are separated by an odd number of subpixels. This results in a good mixing of different color center subpixels, such as in FIG. 3. As a result, there are fewer artifacts from inaccurate interpolation. In FIG. 4B, adjacent center subpixels are separated by an even number of subpixels. As a result, there are regions where center subpixels are all the same color, yielding the streaky image artifacts shown in FIG. 4B.

In general, it is desirable to design the plenoptic imaging system so that there is a good mixing of center subpixels of different colors. In an ideal case, each center subpixel has at least one nearest neighbor center subpixel of a different color. In the case of a Bayer pattern, one way to achieve this is to ensure that the centroid separation is approximately an odd number of subpixels. More specifically, in a Bayer pattern, green pixels repeat with a period of two subpixels, so a centroid spacing that is an odd number of subpixels will ensure that adjacent center subpixels will not both be green. The same is true for red and blue. More generally, if one color repeats with a period of N subpixels, then it is generally desirable that the centroid separation is not close to an integer multiple of N.

Figure 5:
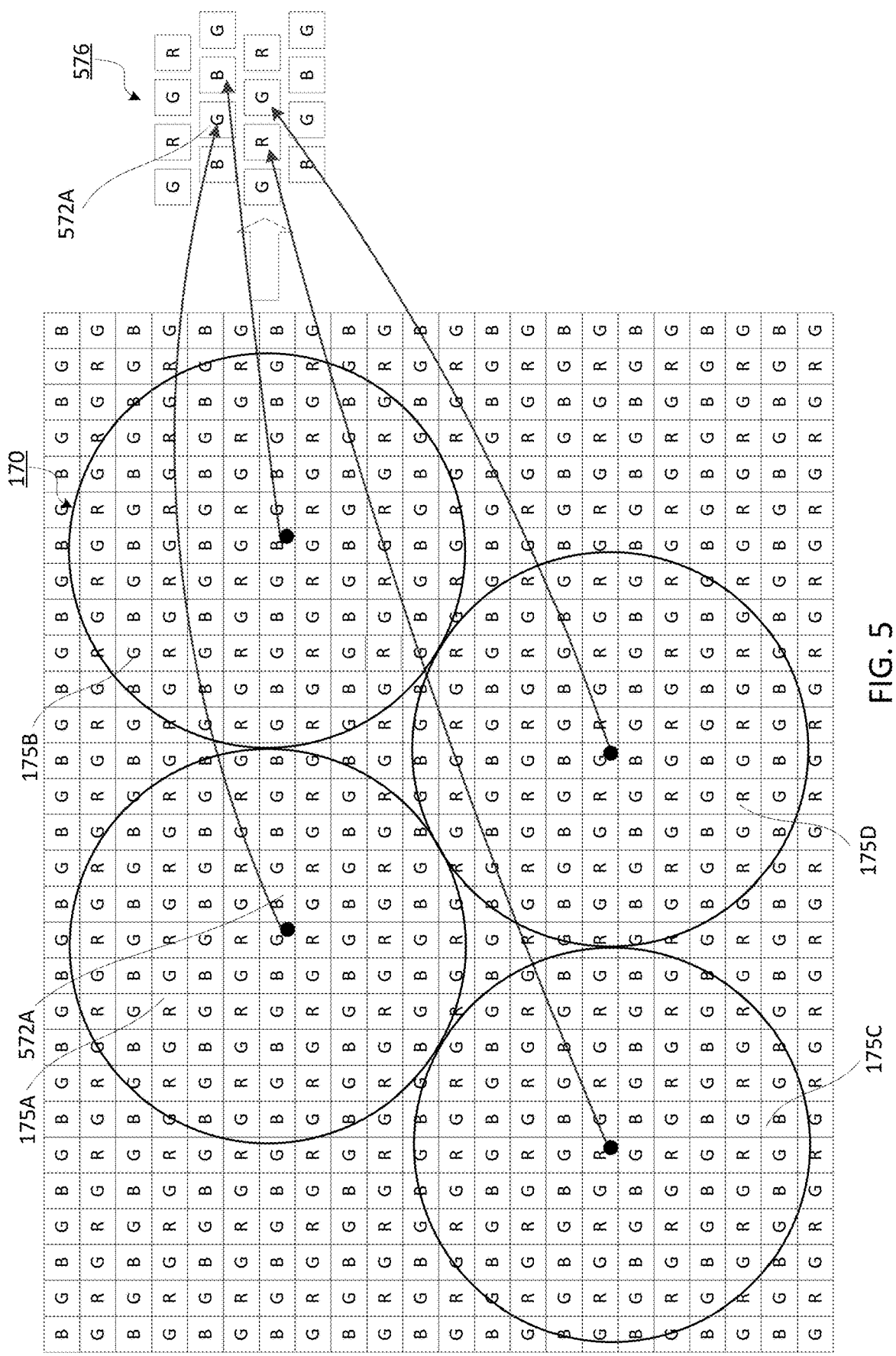
FIG. 5 is a diagram showing spacing of center subpixels in a hexagonally-packed plenoptic image, according to one example embodiment.

FIG. 3 shows alternating red, green and blue center subpixels for a square-packed plenoptic image. FIG. 5 is a diagram showing alternating red, green and blue center subpixels for a hexagonally-packed plenoptic image, according to one example embodiment. FIG. 5 shows four superpixels 175A-D in a plenoptic image 170. Each superpixel 175A-D has a corresponding center subpixel 572A-D (only 572A is labelled in FIG. 5). The upper right of FIG. 5 shows a collection of just the center subpixels 572, which is the captured center view data 576 for this case. The center 2×2 set of center subpixels in this captured data 576 are the center subpixels 572A-D from the plenoptic image 170. The arrows between the plenoptic image 170 and the captured data 576 show the correspondence. Center subpixel 572A from the plenoptic image 170 corresponds to center subpixel 572A in the captured center view data 576, and so on. The center subpixels 572 are alternating in color.

Figure 6:
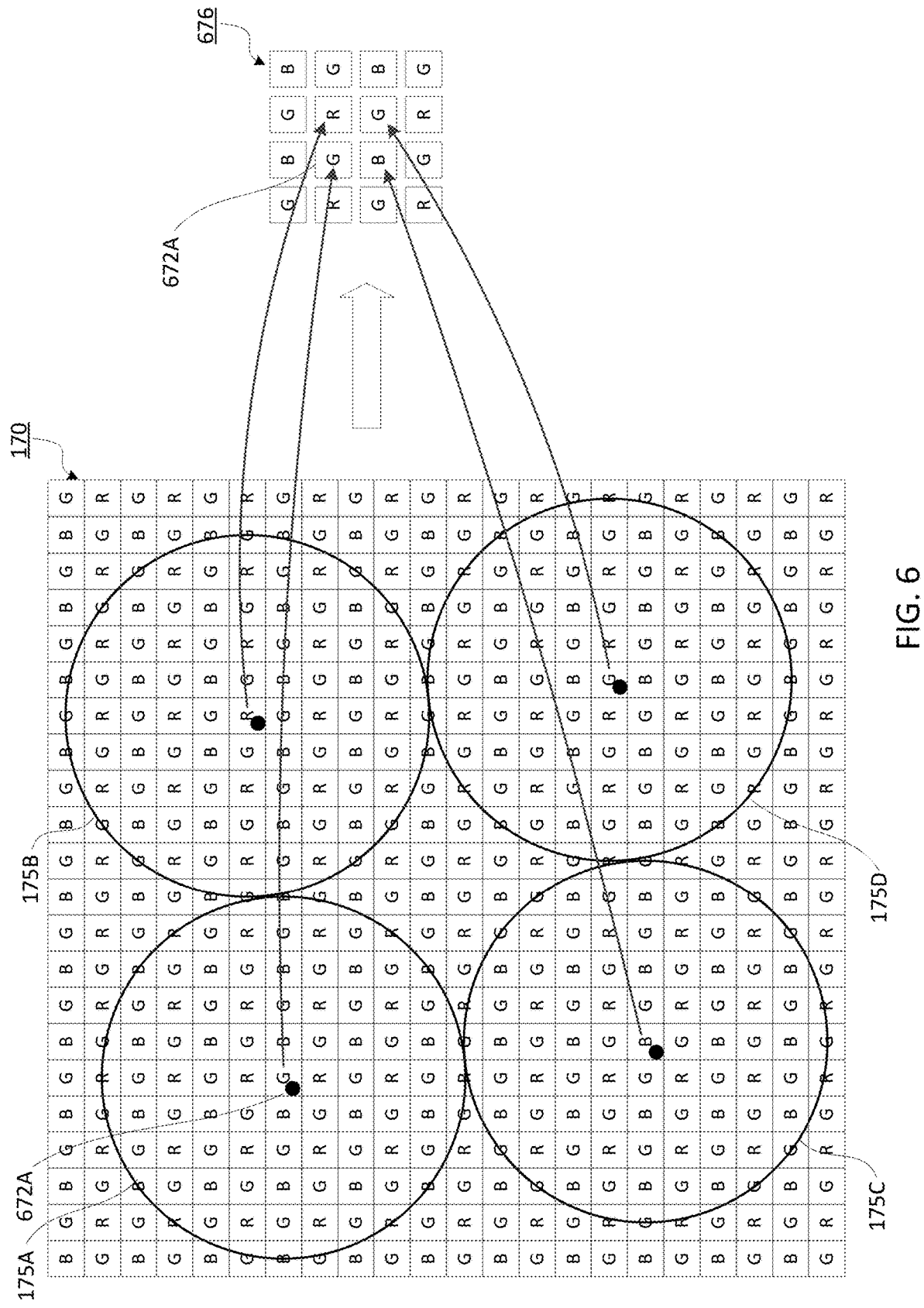
FIG. 6 is a diagram showing spacing of center subpixels in a rotated, square-packed plenoptic image, according to one example embodiment.

Referring again to FIG. 3, the plenoptic image in this example had a spacing between center subpixels that was 9 subpixels. Because this is an odd number of pixels, the center subpixels alternate in color. If the center subpixel spacing were an even number of subpixels, such as 10, then the center subpixels would all be the same color. FIG. 6 shows an example where the center subpixel spacing is 10 subpixels, but the center subpixels alternate in color because the microlens array is rotated relative to the sensor array. Each superpixel 175A-D has a corresponding center subpixel 672A-D. The center 2×2 set of center subpixels in the captured data 676 are the center subpixels 672A-D from the plenoptic image 170. The arrows between the plenoptic image 170 and the captured data 676 show the correspondence. The center subpixels 672 are alternating in color. In this example, adjacent center subpixels are not in the same row of subpixels. Rather, they are offset by one row.

In one variation, the microlens array and sensor array are rotatable relative to each other. Thus, they can be rotated to achieve a good mix of different color center subpixels.

Figure 7:
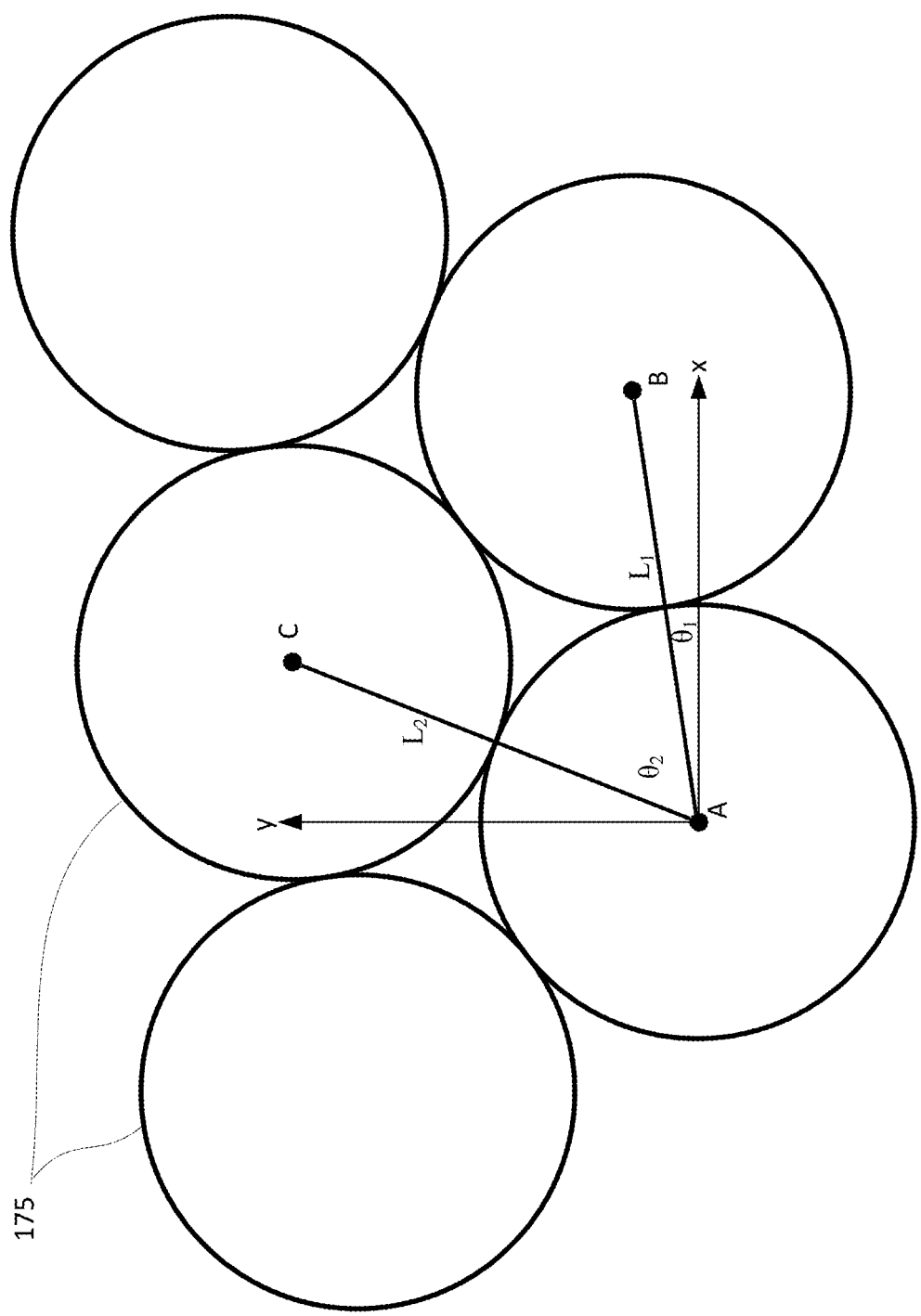
FIG. 7 illustrates the geometry of superpixels in a plenoptic image, according to one example embodiment.

FIG. 7 illustrates the geometry of superpixels relative to an underlying sensor array. In the illustrated example, each circle is a superpixel 175 of a corresponding microlens in the microlens array. The sensor array is not shown for clarity, but the x and y axes show the orientation of the sensor array. That is, the sensor array is a rectangular Bayer pattern of red, green and blue sensors, where the array is oriented along the x and y axes. The points A, B, and C are the centroids of their respective superpixels. The superpixel array also has two principal axes, one along the AB direction and one along the AC direction. AB is the centroid separation along one principal axis. It has length $L_1$ at angle $\theta_1$ relative to the sensor array's x axis. AC is the centroid separation along the other principal axis, with length $L_2$ at angle $\theta_2$. FIG. 7 shows a general geometry. If the superpixel array is rectangular, then $\theta_2 = \theta_1 + \pi/2$. If the superpixel array is square, then $\theta_2 = \theta_1 + \pi/2$ and $L_1 = L_2$. If the superpixel array is hexagonal, then $\theta_2 = \theta_1 + \pi/3$ and $L_1 = L_2$.

Returning to the general case, the horizontal and vertical separations $\Delta x_1$ and $\Delta y_1$ of centroid B and centroid A are given by:

$$\Delta x_1 = L_1 \cos \theta_1$$

$$\Delta y_1 = L_1 \sin \theta_1 \quad (4)$$

Now assume that center subpixel A is green and is in a row that contains blue and green subpixels, then the color of center subpixel B is determined by Table 1 below, depending on whether the horizontal and vertical separations $\Delta x_1$ and $\Delta y_1$ are even or odd:

TABLE 1

| | Color of center subpixel B | |
|---|---|---|
| $\Delta x_1$ | $\Delta y_1$ | Color of center subpixel B |
| Odd | Even | blue |
| Even | Odd | red |
| Even | Even | green |
| Odd | Odd | green |

A similar analysis applies to center subpixel C relative to A. To achieve a good mixing of colors, center subpixel B should be either blue or red, and center subpixel C should be the other color.

These observations are consistent with the designs shown in FIGS. 3, 5 and 6. In FIG. 3, the horizontal and vertical separations for the two principal directions are ($\Delta x_1 = 9$, $\Delta y_1 = 0$) and ($\Delta x_2 = 0$, $\Delta y_2 = 9$). In FIG. 5, ($\Delta x_1 = 11$, $\Delta y_1 = 0$) and ($\Delta x_2 = 6$, $\Delta y_2 = 9$). In FIG. 6, ($\Delta x_1 = 10$, $\Delta y_1 = 1$) and ($\Delta x_2 = -1$, $\Delta y_2 = 10$). Of course, the distance between centroids along each principal direction can be a non-integer number, so a general goal for Bayer patterns is to design centroid separations according to the top two rows of Table 1 and avoiding the bottom two rows.

In a slightly more relaxed approach, rather than requiring horizontal and vertical separations of (odd,even) along one principal direction and (even,odd) along the other principal direction, the goal is relaxed to having horizontal and vertical separations of (odd,any) along one principal direction and (any,odd) along the other principal direction. Continuing the above example with reference to FIG. 7, if center subpixel A is green, the more strict formulation would result in a center subpixel B that is blue (red). The more lenient formulation means that center subpixel B could be either green or blue (red), but it will be in a column with blue (red) subpixels so that immediately adjacent subpixels would be blue (red).

These principles can be used to design plenoptic imaging systems. For example, in a particular design, the plenoptic imaging system includes a hexagonally-packed microlens array with a microlens diameter of 45 µm. The space between the edges of adjacent microlenses of the microlens array is 5 µm. This distance will be called the negative space. The resulting spacing between adjacent microlenses is 50 µm. This distance will be called the microlens separation (i.e. the combination of the microlens size and the negative space). Generally, the microlens separation is the same as the centroid separation. Further assume a rotation angle $\theta$ of 0° and a subpixel size of 3.69 µm. The radius of the superpixel is then 6.77 subpixels. The horizontal separation ($\Delta x$) along the first principal direction is $2 r \cos \theta = 13.53$ subpixels. The vertical separation ($\Delta y$) along the second principal direction is $2 r \sin(\theta + \pi/3) = 11.71$ subpixels. These are both close to even integers. Therefore, the center views generated from this design can include color artifacts because of the nearly even separation.

One way to improve this design is to change the center subpixel separation, for example by changing the microlens separation. If the microlens separation is increased to 55.5 then the radius of the superpixel is 7.45 subpixels, the horizontal separation is 14.89 subpixels, and the vertical separation is 12.89 subpixels (i.e. odd center subpixel separation). In this example, the center view generated from this plenoptic imaging system can include fewer color artifacts due to the odd separations. Alternately, the size of the subpixels can be changed, since the behavior depends on the relative sizes of the superpixels and the subpixels.

Another way to improve the design is by changing the rotation angle $\theta$. For example, if the microlens array is attached with a rotation angle of 16°, then the radius of the superpixel is 6.78 pixels, the horizontal separation is 13.08 pixels, and the vertical separation is 9.07 pixels. In this example embodiment, the previews generated from this plenoptic imaging system can include fewer color artifacts due to the odd separation in the horizontal and vertical direction.

FIG. 8 illustrates an example of a process for designing a plenoptic imaging system, according to the above. The system accesses 810 a trial design of the plenoptic imaging system. The trial design can include information on microlens size, negative space, microlens spacing, superpixel spacing, pixel size, rotation angle, or any other hardware configuration of the plenoptic imaging system that can influence the colors of the center subpixels. The system determines 820 the colors of the center subpixels of the plenoptic image. It then improves 830 the trial design by adjusting the hardware configuration to increase the mixing of different color center subpixels. The adjustment can include: changing the size or geometry of the sensor array, rotating elements of the plenoptic imaging system, changing the size or geometry of the microlens array, or any combination of the preceding adjustments (e.g. rotating elements and changing the size of the microlens array). This could be done iteratively, repeating steps 820 and 830 until satisfactory performance is achieved.

The quality of "mixing" of different color center subpixels can be evaluated in different ways. One approach described above is based on determining the horizontal and/or vertical separations of the centroids along the two principal directions and trying to make these an odd number of subpixels. Another approach is based on trying to alternate colors for adjacent center subpixels. This can be achieved by increasing the number or percentage of adjacent center subpixels that are different colors, or by decreasing the number or percentage of adjacent center subpixels that are the same color. Yet another approach is based on trying to ensure that adjacent center subpixels of the same color are not too far apart. For example, all center subpixels are separated from the nearest neighbors of the same color by not more than a certain number of center subpixels of other colors. Yet another approach is based on trying to ensure that there are no clusters of center subpixels of the same color, for example by limiting the number of contiguous center subpixels of the same color.

Figure 9:
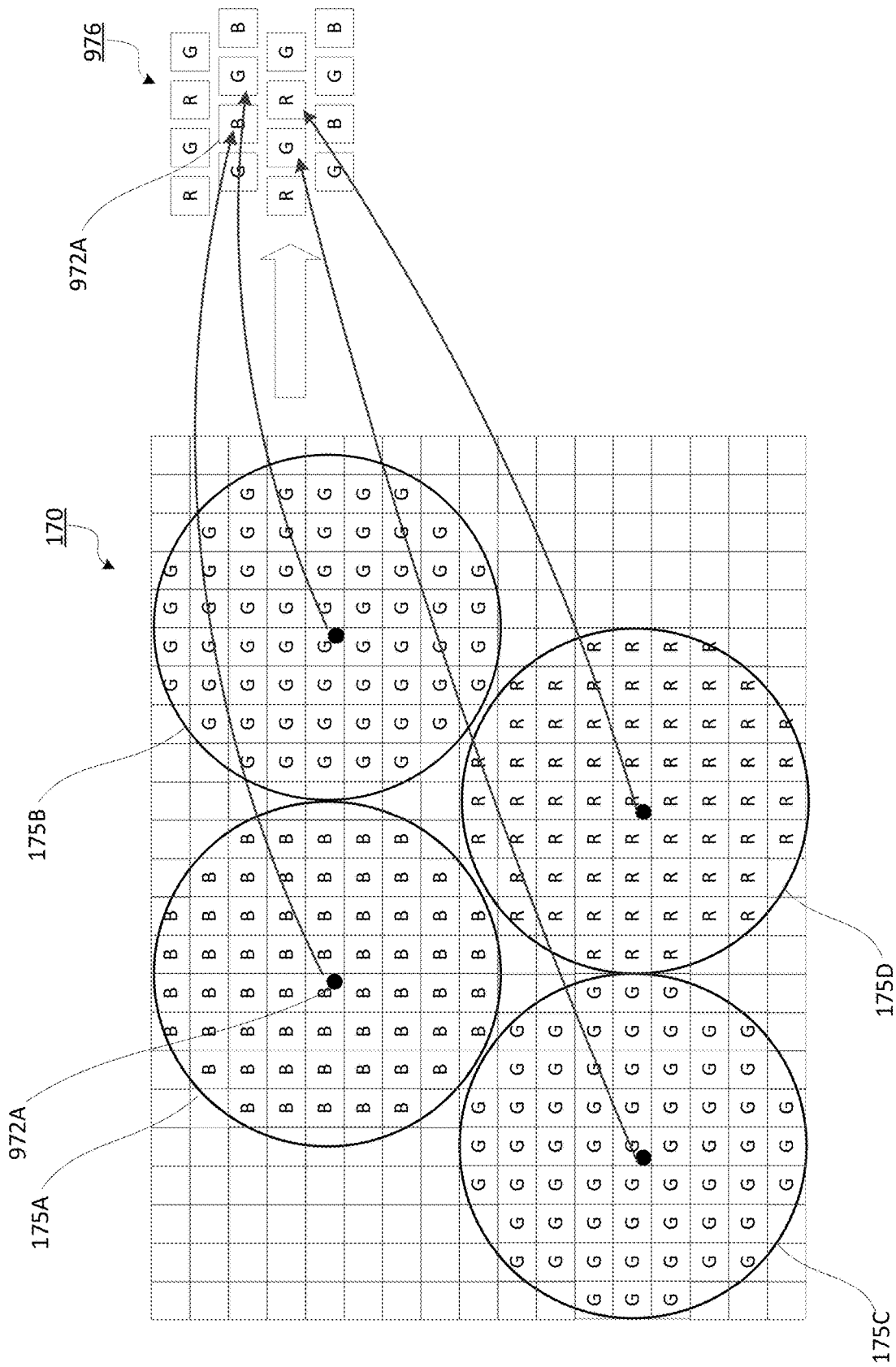
FIG. 9 illustrates the geometry of superpixels in a plenoptic image, according to one example embodiment.

FIG. 9 illustrates the geometry of superpixels in a plenoptic image, according to another example embodiment. In this design, the color filter array is applied to the microlens array rather than the sensor array. That is, a red, green or blue color filter is applied to each microlens, using a Bayer pattern. Therefore, every subpixel within a superpixel is the same color and the colors within each superpixel alternate according to the color filter array. In this example, the sensors of the sensor array are monochromatic (i.e. not individually filtered). Each of the microlenses of the microlens array are color filtered according to the Bayer pattern. Thus every subpixel of the superpixels 175 in the plenoptic image 170 can be associated with the color of its associated microlens. The figure illustrates the pre-filtered subpixels associated with a red microlens as "R," with a green microlens as "G," and with a blue microlens as "B." The center subpixel 972 of every superpixel is illustrated with a "•". The captured center view data 976 alternates between colors because the color filters applied to the microlenses alternates between colors. In this approach, since all the subpixels for superpixel 175A are blue, the red and green components are determined using values from other superpixels. In other embodiments, other types of optical filter may be used in the color filter array including an infrared filter, an ultraviolet filter, a white filter, a polarizer, etc. In this configuration, the plenoptic imaging system produce center views that include alternative imaging data (e.g. a color-infrared image).

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In alternate embodiments, aspects of the invention are implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A color plenoptic imaging system comprising:
   imaging optics that image an object onto an image plane of the imaging optics, the imaging optics characterized by a pupil located at a pupil plane;
   a microlens array located at the image plane of the imaging optics; and
   a rotatable sensor array located at a conjugate to the pupil plane, the microlens array imaging the pupil plane onto the sensor array, the sensor array capturing a plenoptic image of the object, the plenoptic image comprising a plurality of superpixels, each superpixel including a center subpixel, the collection of center subpixels from the plurality of superpixels forming a set of captured center view data for the object;
   wherein:
      the rotatable sensor array comprises at least two arrays of different color sensors that capture subpixels of different colors; and
      the rotatable sensor array is rotated relative to the microlens array such that:
         (i) within the set of captured center view data, for each of the different colors, adjacent center subpixels of that color are separated by not more than three intervening center subpixels of a different color, and
         (ii) a number of adjacent center subpixels that are the same color is reduced.

2. The plenoptic imaging system of claim 1 wherein, within the set of captured center view data, for each of the different colors, adjacent center subpixels of that color are separated by not more than two intervening center subpixels of a different color.

3. The plenoptic imaging system of claim 1 wherein, within the set of captured center view data, for each of the different colors, adjacent center subpixels of that color are separated by not more than one intervening center subpixel of a different color.

4. The plenoptic imaging system of claim 1 wherein the microlens array and the sensor array are rotated relative to each other such that, within the plenoptic image, adjacent center subpixels are not in a same row of subpixels.

5. The plenoptic imaging system of claim 1 wherein the sensor array comprises arrays of red, green and blue color sensors.

6. The plenoptic imaging system of claim 1 wherein the sensor array comprises an array of visible color sensors and an array of infrared sensors.

7. The plenoptic imaging system of claim 1 wherein the captured center view data is used to generate a preview image of what the plenoptic imaging system captures.

8. The plenoptic imaging system of claim 7 wherein the preview image is a color image interpolated from the center subpixels.

9. The plenoptic imaging system of claim 1 further comprising:
a color filter array with one color filter for each microlens in the microlens array; the color filters consisting of red, green and blue color filters arranged in a Bayer pattern.

10. The plenoptic imaging system of claim 1, wherein the sensor array containing the color sensors is defined by an x axis and a y axis; and,
within the plenoptic image, either a horizontal separation $\Delta x$ or a vertical separation $\Delta y$ between adjacent center subpixels is an odd number of subpixels, plus or minus a quarter subpixel.

11. The plenoptic imaging system of claim 10 wherein the sensor array comprises red, green and blue color sensors arranged in a Bayer pattern.

12. The plenoptic imaging system of claim 1 wherein the microlenses are arranged in an array defined by a first principal axis and a second principal axis; either a horizontal separation $\Delta_{x1}$ or a vertical separation $\Delta_{y1}$ between center subpixels that are adjacent along the first principal axis is an odd number of subpixels, plus or minus a quarter subpixel; and either a horizontal separation $\Delta_{x2}$ or a vertical separation $\Delta_{y2}$ between center subpixels that are adjacent along the second principal axis is also an odd number of subpixels, plus or minus a quarter subpixel.

13. The plenoptic imaging system of claim 12 wherein $(\Delta_{x1}+\Delta_{y1})$ is an odd number of subpixels, plus or minus a quarter subpixel; and $(\Delta_{x2}+\Delta_{y2})$ is an odd number of subpixels, plus or minus a quarter subpixel.

14. The plenoptic imaging system of claim 1 wherein the superpixels are arranged in a hexagonal array.

* * * * *